United States Patent [19]

Marzluf

[11] Patent Number: 4,593,648
[45] Date of Patent: Jun. 10, 1986

[54] ELECTRIC FISH-REPELLING DEVICE

[75] Inventor: Werner Marzluf, Rheinstetten, Fed. Rep. of Germany

[73] Assignee: Maschinenfabrik Hellmut Geiger GmbH & Co. KG, Karlsruhe, Fed. Rep. of Germany

[21] Appl. No.: 602,725

[22] Filed: Apr. 23, 1984

[51] Int. Cl.⁴ .................................................. A01M 29/00
[52] U.S. Cl. ................................................................ 119/3
[58] Field of Search ........................... 119/3; 324/365; 340/852; 204/196

[56] References Cited

U.S. PATENT DOCUMENTS 1,515,547  11/1924  Burkey ................................ 119/3
1,974,444  9/1934   Burkey ................................ 119/3
2,010,601  8/1935   Loughridge ........................... 119/3
2,233,045  2/1941   Bonner et al. ........................ 119/3
3,634,222  1/1972   Stephens, Jr. ....................... 204/196

FOREIGN PATENT DOCUMENTS 2530961  1/1977  Fed. Rep. of Germany .

Primary Examiner—Hugh R. Chamblee
Attorney, Agent, or Firm—Wenderoth, Lind & Ponack

[57] ABSTRACT

An electric fish-scaring device for water inlet and extraction structures contains several main and counter-electrodes below the surface of the water and which are connected to a voltage supply unit. To monitor operation, at least one simulator electrode is positioned at a predetermined distance in front of the main electrodes.

6 Claims, 1 Drawing Figure

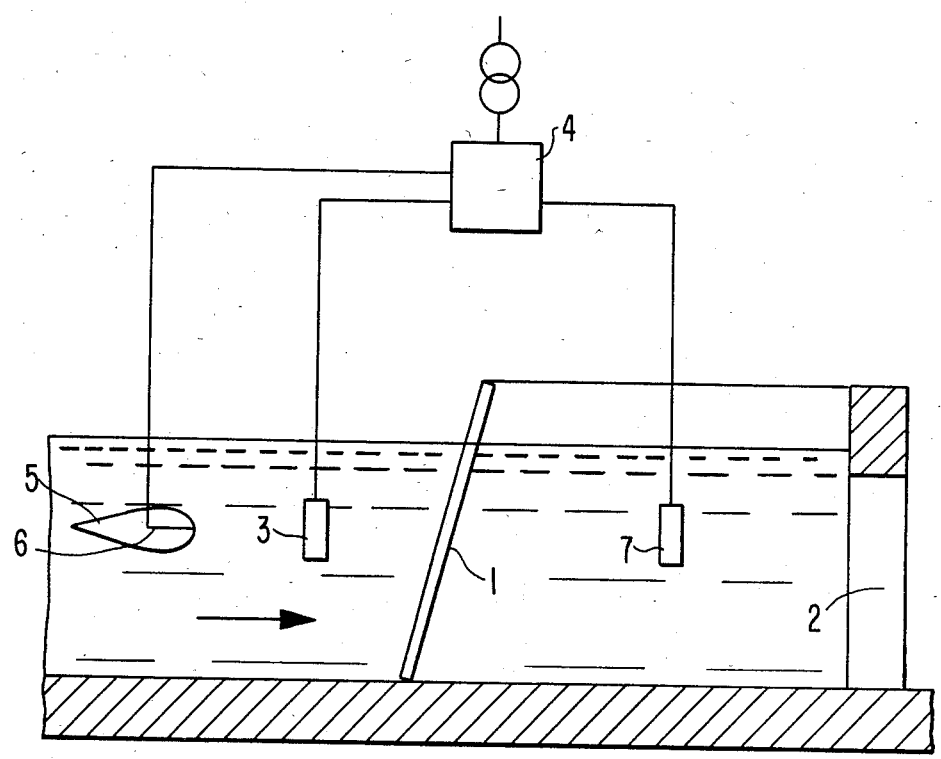

ELECTRIC FISH-REPELLING DEVICE

BACKGROUND OF THE INVENTION

The invention relates to an electric fish scaring or repelling device, intended particularly for water inlet and extraction structures, in which several main electrodes are positioned below the surface of the water and connected to a voltage supply unit which produces a pulsed voltage pattern.

Fish-scaring devices are used as a measure to conserve fish stocks and to avoid interruptions in the operation of and the risk of damage to items of equipment in power stations. These devices are installed in the vicinity of water inlet and extraction structures and prevent corresponding damage to the environment as a result of the destruction of organisms living in the water, particularly fish. Electric fish-scaring devices already in use contain a number of main and counter-electrodes which are positioned at appropriate intervals, and which are connected to the terminals of a d.c. or a.c. voltage supply unit. This voltage supply unit generates series of positive and negative pulses which are supplied to the main and counter-electrodes. Known fish scaring devices of the type described above are kept in operation with practically no further checks after preliminary tests and the comprehensive measurements and adjustments of the device carried out during commissioning. As a result a change and particularly a reduction in the scaring effect are noticed only when considerable damage has occurred.

Such changes in the scaring effect can occur as a result of fluctuations in the electrode characteristics, which may, for example, take the form of an accelerating increase in the surface resistance or of changing characteristic values of water composition, particularly the conductivity of the water, which determines the extent of the field, and the distribution of the organisms.

SUMMARY OF THE INVENTION

The invention is based on the need to develop an electric fish scaring or repelling device that will permit continuous monitoring of its effectiveness and, where necessary, appropriate readjustment of its current density or field strength components. The solution to this problem lies in the fact that at least one simulator electrode is positioned at a predetermined distance in front of the main electrodes. This enables the electrical current density or field strength to be monitored in realistic environmental conditions.

As the electrical field strength is essentially determined by the distribution of the dielectrics or conductive liquids, it appears appropriate to make the simulator electrode of such a material and in such a form that in its dielectric behaviour and conductivity behaviour and/or its geometry it corresponds to the body of a fish. To conduct the measured values, metallic measurement sensors can usefully be embedded in the simulator electrode or applied as a coating on specific areas of its surface. Because of the additional dependence of the field strength distribution on the distribution of organisms in the water, it may in certain circumstances be desirable to position several simulator electrodes in front of the main electrodes and in consequence to monitor, for example, a larger inlet area for a power station condenser.

Sufficient current density must be available in order to provide an adequate scaring effect. If this density is not achieved, the device will operate with only a very poor degree of effectiveness.

The device is preferably constructed in such a way that counter-electrodes are positioned at a certain distance from the main electrodes, preferably downstream behind the main electrodes. These counter-electrodes can in certain circumstances be replaced by parts of the structure, e.g. by metal grating bars.

When positioning simulator electrodes of this type, the current density or the electrical field strength is measured in the vicinity of the simulator electrode and used as the control signal for the voltage supply unit so that an electrical current density sufficient to ensure the effectiveness of the device is maintained at the simulator electrode independently of variations in the electrode characteristics, the characteristic values of the water and the distribution of organisms. The measured values obtained can be processed by a microprocessor which allows direct display of the current density or field strength for the selected measurement points in the monitored area and can also be used for the automatic regulation of the voltage supply unit.

Application of the invention enables fish-scaring devices to be monitored, and the voltage supply can be regulated in such a way that economical operation is possible with the optimum scaring effect.

BRIEF DESCRIPTION OF THE DRAWING

Other objects, features and advantages of the invention will be apparent from the following description, with reference to the accompanying drawing, wherein the single FIGURE is a schematic view of an example of the device of the invention.

DETAILED DESCRIPTION OF THE INVENTION

In front of a water inlet 2 protected by a grating 1 there is a row of main electrodes 3, which are supplied by a voltage unit 4 with a pulsed d.c. voltage of an appropriate stength and pulse duration. This pulsed voltage passes between the main electrodes 3 and the counter-electrodes 7 located behind the grating 1, which are also connected to the voltage unit.

In front of the main electrodes 3 there is a simulator electrode 5, which consists of a streamlined body imitating the dielectric behaviour and conductivity behaviour of the body of a fish and a measurement sensor 6, which is used to measure the electric field strength. The measurement sensor 6 can be formed with one or several poles and, if appropriate, also consist of several measurement points or plates arranged at a certain distance from the simulator electrode 5. In certain circumstances the measurement sensor 6 can also be connected to a suitably conductive surface coating. To determine the conductivity of the water, a conductivity measurement electrode can also be used if necessary, via a regulating mechanism accommodated in the voltage supply unit 4.

The regulating mechanism, which is installed in the voltage supply unit 4 and will not be described in greater detail, uses the current measured values obtained with the simulator electrode 5, including if appropriate the measured value of conductivity, to regulate the voltage between the main and counter-electrodes 3 and 7 in such a way that a current density sufficient for an adequate scaring effect is basically maintained.

For some applications a simplified version of the simulator electrode is sufficient, which takes the form of an immersed wire or plate-type electrode. In this instance there is no adaptation to specific characteristic values of fish bodies.

I claim:

1. In a fish repelling apparatus, particularly for use at water inlet and extraction structures, said apparatus being of the type including main and counter electrodes positioned beneath the surface of the water adjacent a structure, and a controllable impulse voltage supply unit for supplying pulsed voltage between said main and counter electrodes and thereby for generating in the water an electric field for repelling fish approaching the structure, the improvement comprising:

means, positioned in the water upstream of said main electrodes, for measuring the actual electric current density of said electric field and for generating a signal representative thereof.

2. The improvement claimed in claim 1, wherein said measuring means comprises a metallic measurement sensor having at least one pole.

3. The improvement claimed in claim 1, further comprising simulator means, connected to said measuring means, for simulating the dielectric and conductive characteristics of a fish likely to be encountered, and thereby for accordingly effecting said actual current density measured by said measuring means.

4. The improvement claimed in claim 1, further comprising means for automatically controlling the operation of said voltage supply unit in response to said signal generated by said measuring means.

5. A method of controlling the operation of a fish repelling apparatus of the type including main and counter electrodes positioned beneath the surface of water adjacent a water inlet or extraction structure, and a controllable impulse voltage supply unit for supplying pulsed voltage between said main and counter electrodes and thereby for generating in the water an electric field for repelling fish approaching said structure, said method comprising:

measuring the actual electric current density of said electric field at a location in the water upstream of said main electrodes, and generating a signal representative thereof; and controlling the operation of said voltage supply unit in response to said signal, to ensure that the electric current density is maintained sufficient to achieve repelling of fish.

6. A method as claimed in claim 5, further comprising simulating at said location in the water the dielectric and conductive characteristics of a fish likely to be encountered, and thereby accordingly effecting said measured actual current density.

* * * * *